March 17, 1936.   H. S. WATSON   2,034,319
TRANSMISSION GEARING
Filed Nov. 14, 1934   2 Sheets-Sheet 1
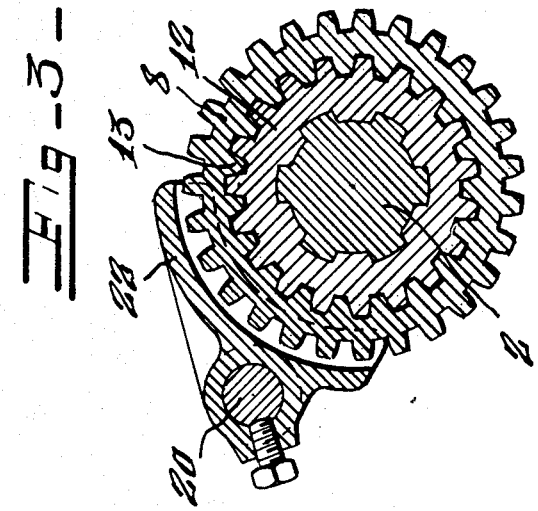
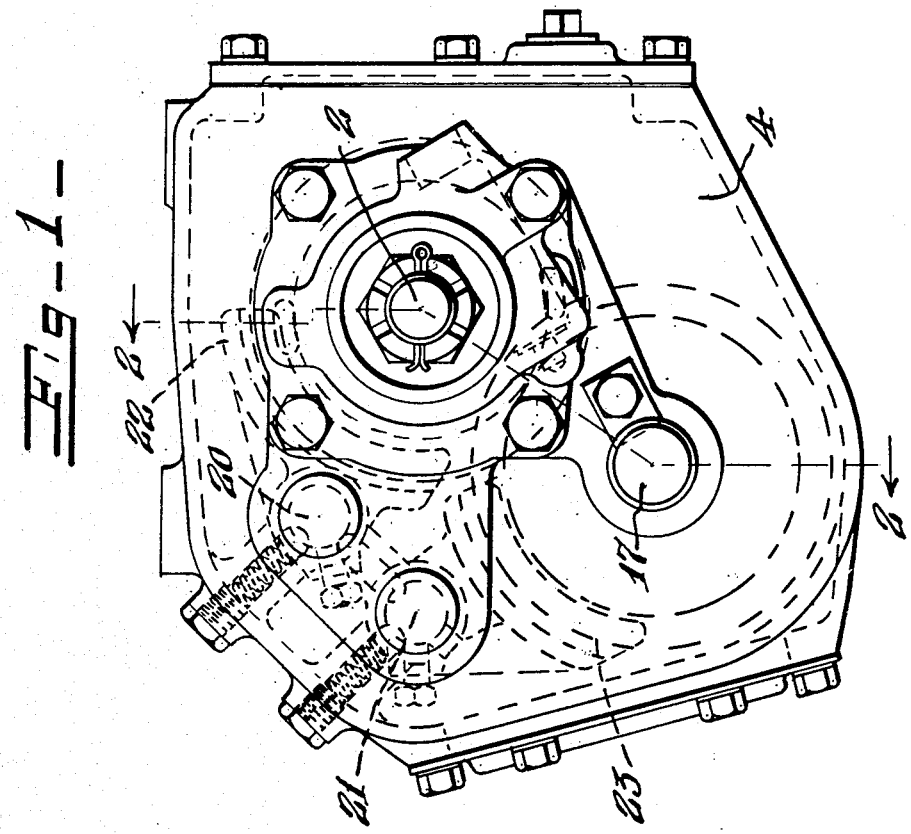
INVENTOR.
Howard S. Watson
BY
Bedell & Thompson
ATTORNEYS.

March 17, 1936.  H. S. WATSON  2,034,319
TRANSMISSION GEARING
Filed Nov. 14, 1934  2 Sheets-Sheet 2
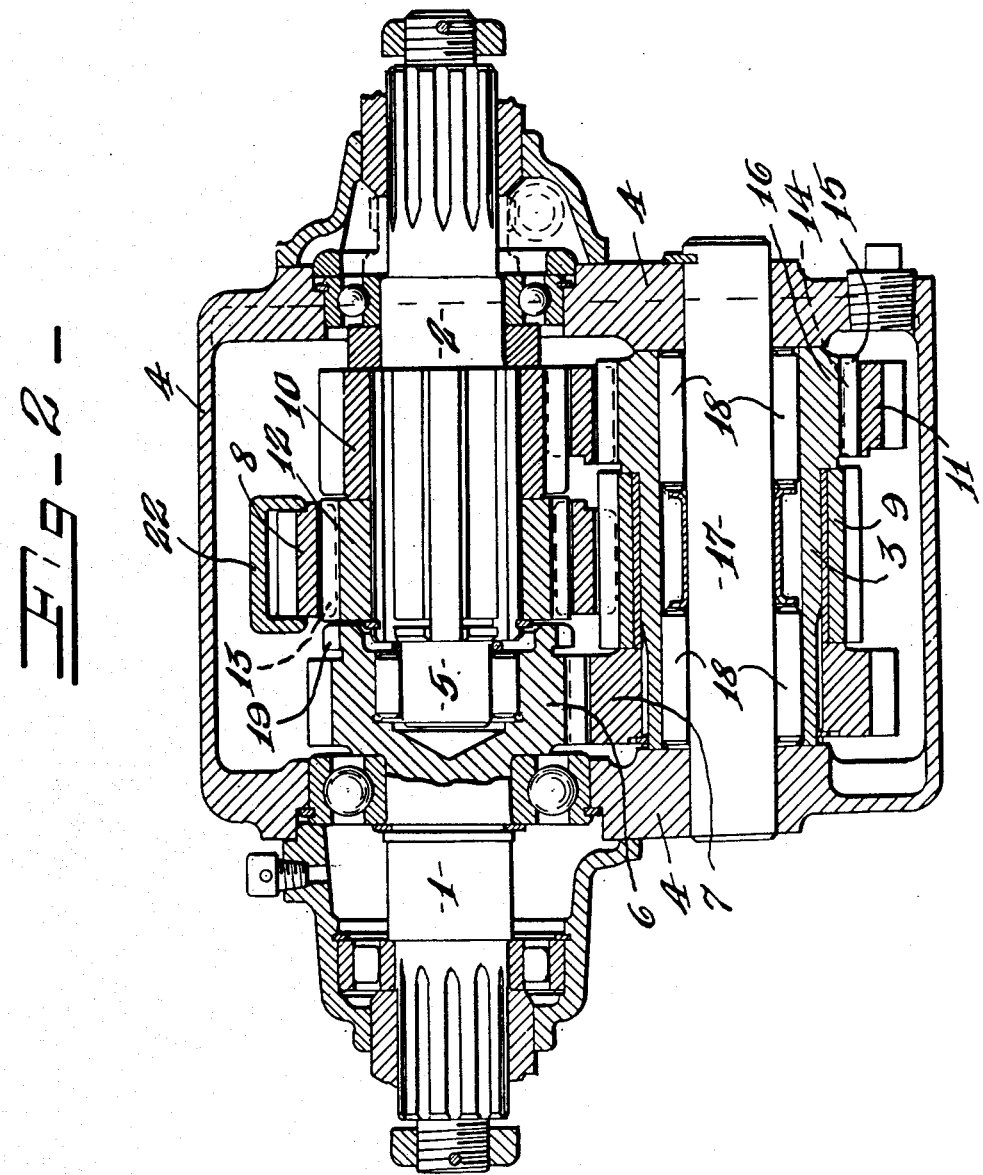
INVENTOR.
Howard S. Watson
BY Bodell & Thompson
ATTORNEYS

UNITED STATES PATENT OFFICE 2,034,319

TRANSMISSION GEARING

Howard S. Watson, San Francisco, Calif., assignor to Spicer Manufacturing Corporation, Toledo, Ohio, a corporation of Delaware Application November 14, 1934, Serial No. 753,020

2 Claims. (Cl. 74—333)

This invention relates to transmission gearings, and has for its object a gearing for producing direct drive and a plurality of indirect drives, as under-drive and over-drive, in the same gear box or space or with the same general gear arrangement, as heretofore used for providing direct drive and one indirect drive, as an under-drive, or direct drive and an over-drive.

In furtherance of this compact arrangement and result, the invention further has for its object a transmission gear in which the shiftable elements are gears which, in addition to performing the function of gears in one situation, are utilized to act as clutches with the ends of gears of the gearing serving as clutch teeth.

It further has for its object a transmission gear of the type set forth in which direct drive and one indirect drive is effected through a shiftable gear rotatable with the transmission shaft and shiftable in one direction to clutch the driving and driven shafts together in direct drive relation, and in the other direction, to clutch a normally loose or floating gear on the transmission shaft thereto, so as to transmit power through a counter shaft to the transmission shaft, and in which a normally loose or floating gear on the counter shaft meshes with the shiftable combined clutch and gear on the transmission shaft and may be clutched to and declutched from the countershaft.

It further has for its object utilizing one of the gears on the counter shaft to clutch to the counter shaft the idle gear thereon, which meshes with the shiftable gear on the transmission shaft.

It further has for its object a compact shifting mechanism for the combined shiftable gears and clutches arranged to shift the gears without increasing the axial length thereof to provide fork grooves and the like.

It further has for its object a gear of this type which is particularly simple and compact in construction and economical to manufacture.

Other objects will appear throughout the specification.

I have here shown my invention as embodied in an auxiliary transmission gear, that is, a transmission gear, used in connection with the regular transmission gear, to increase the number of gear changes.

The invention consists in the novel features and in the combinations and constructions hereinafter set forth and claimed.

In describing this invention, reference is had to the accompanying drawings in which like characters designate corresponding parts in all the views.

Figure 1 is an end elevation of this gearing.

Figure 2 is a sectional view on line 2—2, Figure 1.

Figure 3 is a detail sectional view through one of the shiftable gears and contiguous parts.

This gearing comprises, generally, driving, transmission and counter shafts, with gearing therebetween, including shiftable gears on the transmission shaft and the counter shaft respectively, the shiftable gear on the transmission shaft being shiftable in one direction to connect the driving and transmission shafts in direct drive relation and in the other direction to connect the driving and driven shafts in indirect drive relation through gears on the counter shaft, one of the gears on the counter shaft being shiftable to connect the driving and driven shafts in indirect drive relations, either through the shiftable gear on the transmission shaft or through another gear, normally idle, on the counter shaft.

More specifically, this gearing comprises a suitable gear box, driving and transmission shafts mounted in the gear box in axial alinement, a counter shaft, intermeshing gears on the driving and transmission shafts, one of the gears on the transmission shaft being shiftable in one direction to clutch the driving and transmission shafts together in direct drive relation and in the other direction to lock or clutch to the transmission shaft a normally idle or floating gear on said shaft which meshes with the gear on the counter shaft, and means operable to clutch or lock a normally idle or floating gear on the counter shaft to said counter shaft, which idle gear meshes with the shiftable gear on the transmission shaft. Preferably, the means for locking the idle gear on the counter shaft to said counter shaft is a shiftable gear rotatable with the counter shaft and meshing with the idle or floating gear on the transmission shaft.

I designates the driving shaft; 2 the transmission shaft; and 3 the counter shaft, these being suitably mounted in the gear box 4.

The drive shaft I and transmission shaft 2 are mounted in bearings in the end walls of the box and the transmission shaft 2 has a pilot bearing 5 in the end of the drive shaft I. The counter shaft may be mounted in any suitable manner. One mounting is hereinafter described. The gears between the drive shaft I and counter shaft 3 and transmission shaft 2 include gears on the counter shaft 3 and transmission shaft 2 which are rotatable therewith and also shiftable to lock or clutch to the shafts, normally idle gears on said shafts.

6 and 7 are a pair of intermeshing gears mounted respectively on the drive shaft 1 and counter shaft 3 and rotatable therewith, the gear 6 being usually formed integral with the driving shaft 1, or, in other words, the driving shaft 1 is a stem gear.

8 and 9 are another pair of intermeshing gears carried respectively by the transmission shaft 2 and counter shaft 3, the gear 8 being rotatable with the transmission shaft 2 and the gear 9 mounted to normally be rotatable relatively to the counter shaft 3, that is, it is normally idle or unclutched from the counter shaft 3.

10 and 11 are a third set of intermeshing gears mounted respectively upon transmission shaft 2 and counter shaft 3, the gear 10 being normally idle or loosely or floatingly mounted on the transmission shaft 2 to normally rotate relatively thereto and the gear 11 being connected to the counter shaft 3 to rotate therewith and also to shift axially thereof.

In the illustrated embodiment of my invention, the gear element 8 is mounted upon a hub or collar 12 provided on the shaft 2. It is here shown as splined on the transmission shaft 2 to rotate therewith, as standard transmission shafts are usually splined. The gear 8 is formed with internal gear teeth or splines 13 slidably interlocking with external splines on the hub or collar 12, and it is shiftable axially in one direction from central or neutral position to clutch the drive shaft 1 and transmission shaft 2 in direct drive relation, and in the other direction, to clutch the gear 10 to the transmission shaft to connect the shafts 1 and 2 in indirect drive relation through gears on the counter shaft 3.

The idle or floating gear 9, which meshes with the gear 8, is comparatively wide to remain in mesh with the gear 8 in all shifted positions thereof. This gear 9 is loosely or floatingly mounted on the counter shaft 3, so as to rotate idly when the gear 8 is in either of its shifted positions to clutch the shafts 1 and 2 in direct drive relation, or to clutch the gear 10 to the transmission shaft 2. The gear 11 is mounted on the counter shaft 3 in a manner similar to that in which the gear 8 is mounted on the hub or collar 12, and is formed with internal teeth or splines 14 slidably interlocking with external splines or teeth 15 on a head or enlargement 16 provided on the counter shaft 3. The counter shaft 3 is here shown as a hollow shaft or sleeve supported between the two end walls of the gear box on a stationary spindle 17 mounted in the end walls, antifriction bearings 18 being interposed between the sleeve and the spindle.

The ends of the internal teeth or splines 13 of the gear 8 form clutch teeth for coacting with clutch teeth 19 on the opposing end of the drive gear 6 when the gear 8 is shifted in one direction, as to the left, and for interfitting with or clutching into the ends of the gear teeth of the gear 10 and thereby clutching the gear 10 to the shaft 2 when the gear 8 is shifted in the other direction, as to the right. Likewise, the ends of the internal teeth 14 of the gear 11 serve as clutch teeth to coact with the ends of the gear teeth of the gear 9, when the gear 11 is shifted in one direction, as to the left, to interfit the ends thereof with the ends of the teeth of the gear 9.

The gears 8 and 11 are shifted by any suitable shifting mechanism, and, as here shown, are shifted by means of sliding shift rods 20 and 21 suitably guided in the gear box and having yokes 22 and 23, respectively, embracing portions only of the gears, and thrusting against the end faces of the gears, in contradistinction to forks working in grooves in the hubs of gears.

This arrangement of shifting forks lends itself to the compact feature of the gearing. The shift rods are operated by any well known shifting and selecting mechanism, not shown. The gearing here shown is intended primarily as an auxiliary gearing and produces direct drive and two indirect drives, one of the indirect drives being an over-drive and the other, an under-drive.

In operation, sliding of the combination gear and clutch 8 in one direction, as to the left (Figure 2) to engage its internal teeth or splines 13 with the clutch teeth 19 of the drive gear 6 couples the drive shaft 1 and transmission shaft 2 in direct drive relation. Shifting of the gear 8 to the right from the position shown in Figure 2, causes the internal teeth 13 to interlock with the ends of the teeth of the gear 10, and thus, in effect, clutch the gear 10 to the transmission shaft 2 so that the drive is from the drive shaft 1 through gears 6, 7, counter shaft 3, and gears 11 and 10, the ratio of the gears being such that this is an over-drive.

By shifting the gear 11 to the left, its internal teeth 14 interlock with the ends of the teeth of the floating gear 9 and thus lock the gear 9 to the shaft 3 and produce a second indirect drive or under-drive through the pair of gears 6, 7, counter shaft 3, and gears 9 and 8.

By this arrangement of shiftable gears or gears, which act both as gears and clutches, a particularly compact gear arrangement is produced which is further enhanced by a shifting mechanism comprising forks coacting directly with the gears and not requiring extensions of the hub beyond the ends of the gears to provide space for a fork groove.

What I claim is:

1. In a transmission gearing, a suitable gear box, drive, transmission and counter shafts mounted in the box, intermeshing gears mounted respectively on the driving and counter shafts including a gear on the drive shaft having clutch teeth, the transmission shaft having a head opposed to the gear on the drive shaft, a shiftable gear having internal teeth slidably interlocked with complemental teeth of the head, a normally idle gear mounted on the transmission shaft adjacent the shiftable gear, the ends of the internal teeth of the shiftable gear forming clutch teeth and the shiftable gear being shiftable in one direction to engage like ends of the internal teeth with the clutch teeth of the driving gear and in the other direction to engage the ends of the internal teeth with the ends of the teeth of the idle gear, the counter shaft having a collar and a shiftable gear having internal teeth slidably interlocking with complemental teeth of the collar, the shiftable gear on the counter shaft meshing with the normally idle gear on the transmission shaft, the counter shaft having an idle gear thereon meshing with the shiftable gear on the transmission shaft, the ends of the internal teeth of the shiftable gear on the counter shaft forming clutch teeth, and said shiftable gear on the counter shaft being shiftable to interlock its clutch teeth with the teeth of the idle gear on the counter shaft, and means for shifting the shiftable gears.

2. In a transmission gearing, a suitable gear box, drive, transmission and countershafts mounted in the box, the drive and transmission shafts being mounted in axial alinement, intermeshing gears mounted respectively on the driving and countershafts, a shiftable gear mounted on the transmission shaft and rotatable therewith and slidable axially thereof, a non-shiftable, normally idle gear on the transmission shaft adjacent the shiftable gear and being normally rotatable relatively to the transmission shaft, the countershaft having a gear thereon meshing with the idle gear on the transmission shaft, and also an intermediate non-shiftable idle gear rotatable relatively to the countershaft, and meshing with the shiftable gear on the transmission shaft, the shiftable to lock the intermediate idle gear on shiftable in one direction from a neutral position to clutch the driving and transmission shafts together in direct drive relation, and in the other direction from neutral to lock the idle gear on the transmission shaft to the transmission shaft, and one of the gears on the countershaft being shiftable gear on the transmission shaft being the countershaft to the countershaft.

HOWARD S. WATSON.

CERTIFICATE OF CORRECTION.

Patent No. 2,034,319.  March 17, 1936.

HOWARD S. WATSON.

It is hereby certified that error appears in the printed specification of the above numbered patent requiring correction as follows: Page 3, second column, line 3, claim 2. strike out the words "to lock the intermediate idle gear on" and insert the same after "shiftable" in line 10 of same claim; same line 10, strike out the words "gear on the transmission shaft being" and insert the same after "shiftable" in line 3; and that the said Letters Patent should be read with these corrections therein that the same may conform to the record of the case in the Patent Office.

Signed and sealed this 5th day of May, A. D. 1936.

Leslie Frazer (Seal) Acting Commissioner of Patents.